US010526669B2

(12) United States Patent
You et al.

(10) Patent No.: US 10,526,669 B2
(45) Date of Patent: Jan. 7, 2020

(54) METHOD AND SYSTEM FOR FORMING CARBONATE FROM STEEL SLAG

(71) Applicant: DOOSAN HEAVY INDUSTRIES & CONSTRUCTION CO., LTD., Changwon-si, Gyeongsangnam-do (KR)

(72) Inventors: Jang Yong You, Suwon-si (KR); Ja Hyung Koo, Suwon-si (KR); Kwang Hee Shin, Daegu (KR); You Seok Kim, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 132 days.

(21) Appl. No.: 15/658,937

(22) Filed: Jul. 25, 2017

(65) Prior Publication Data

US 2018/0171421 A1    Jun. 21, 2018

(30) Foreign Application Priority Data

Dec. 19, 2016  (KR) .................. 10-2016-0173653
Dec. 23, 2016  (KR) .................. 10-2016-0177411
Jan. 24, 2017  (KR) .................. 10-2017-0010865

(51) Int. Cl.
*C21B 3/04*    (2006.01)
*C01F 11/18*    (2006.01)

(52) U.S. Cl.
CPC .............. *C21B 3/04* (2013.01); *C01F 11/18* (2013.01); *C21B 2100/80* (2017.05)

(58) Field of Classification Search
CPC ................................... C02F 1/4691
See application file for complete search history.

(56) References Cited

U.S. PATENT DOCUMENTS

2013/0052088 A1*  2/2013  Kim .................. C01F 11/18
                                                    422/119

FOREIGN PATENT DOCUMENTS

| KR | 10-0891551 B1 | 4/2009 |
| KR | 10-1175422 B1 | 8/2012 |
| KR | 10-2013-0023796 A | 3/2013 |
| KR | 10-1487977 B1 | 2/2015 |

OTHER PUBLICATIONS

Lee, Chul-Young, Resource utilization through pH deactivation of iron slag leachate, Environment of Engineering Major, 2009, Kyungpook National University.

* cited by examiner

*Primary Examiner* — Salil Jain
(74) *Attorney, Agent, or Firm* — Invenstone Patent, LLC

(57) ABSTRACT

The present invention relates to a method and system for recovering carbonate from steel slag, in which it is possible to extract carbonate from steel slag and reuse the extracted carbonate, and to recycle steel slag and make use of $CO_2$ gas without emission to the atmosphere. Since unreacted metal ions and an acidic solvent are reused in the method and system, it is possible to increase carbonate extraction efficiency and reduce an amount of waste.

11 Claims, 7 Drawing Sheets

METHOD AND SYSTEM FOR FORMING CARBONATE FROM STEEL SLAG

CROSS-REFERENCE(S) TO RELATED APPLICATIONS

This application claims priority to Korean Patent Application Nos. 10-2016-0173653, filed on Dec. 19, 2016; 10-2016-0177411, filed on Dec. 23, 2016; and 10-2017-0010865, filed on Jan. 24, 2017, the disclosures of which are incorporated herein by reference in their entirety.

BACKGROUND OF THE INVENTION

Field of the Invention

Exemplary embodiments of the present invention relate to a method and system for recovering carbonate from steel slag and, more particularly, to a method and system for extracting metal ions contained in steel slag to recover the extracted metal ions for carbonate.

Description of the Related Art

Slag is an essential product generated in steel smelting processes. This slag is essentially produced from gangue components of iron ore or coke in iron making processes, or from oxides obtained during oxidation and deoxidation of molten iron or molten steel or supplementary materials added for refining in steel making processes.

The generation of blast-furnace slag and steel slag as industrial by-products has increased rapidly every year in steel mills, but there is a lack of effort to use and apply the by-products compared to the amount of generation thereof. Accordingly, most of the by-products are buried or left in separate sites within business establishments, which leads to serious environmental issues.

Slag includes $SiO_2$ and $CaO$ as an elementary system, and $Al_2O_3$, $FeO$, $MgO$, $P_2O_5$, $CaS$, and the like depending on the type of refining reaction. Steel slag based on oxidation of molten iron or molten steel includes $CaO$—$SiO_2$—$FeO$ as an elementary system.

A variety of techniques have been developed to use steel slag, and Korean Patent Nos. 10-1487977 and 10-1175422 disclose a method of recovering Fe from steel slag and a method of recovering valuable metals from slag, respectively. However, these documents are related to recovering a Fe component from steel slag, and there has been no practical technique for recovering other components.

Accordingly, it is urgently necessary to develop techniques for recovering metal components extracted from steel slag.

SUMMARY OF THE INVENTION

Accordingly, the present invention is directed to a method and system for recovering carbonate from steel slag that substantially obviate one or more problems due to limitations and disadvantages of the related art.

The present invention provides a method and system for recovering carbonate from steel slag, which are capable of extracting metal ions from steel slag and recovering carbonate by reaction of the extracted metal ions with carbon dioxide in order to recycle steel slag and make use of $CO_2$ gas.

The present invention provides a method and system for recovering carbonate from steel slag, which are capable of increasing carbonate extraction efficiency by reusing unreacted metal ions and an acidic solvent generated in processes of extracting carbonate minerals from steel slag.

Other aspects of the present invention can be understood by the following description, and become apparent with reference to the embodiments of the present invention. Also, it is obvious to those skilled in the art to which the present invention pertains that the benefits of the present invention can be realized by the means as claimed and combinations thereof.

In accordance with one aspect of the present invention, a method of recovering carbonate from steel slag comprises 1) mixing steel slag and an acidic solvent to produce a first mixture containing metal ions, 2) separating the first mixture into a second mixture, containing the metal ions, and residues by allowing the first mixture to pass through a first filter, 3) inserting and mixing ligands into and with the second mixture to produce a third mixture containing a complex compound produced by reaction of the metal ions with the ligands, 4) separating the complex compound from the third mixture by an electrochemical method, 5) reacting the separated complex compound with $CO_2$ to produce carbonate, and 6) separating the produced carbonate.

The complex compound with no charge may be separated from unreacted charged ligands and unreacted charged metal ions by the electrochemical method using a single capacitive deionizer in the 4) separating the complex compound from the third mixture, and the unreacted charged ligands and the unreacted charged metal ions may be supplied to the 1) mixing steel slag and an acidic solvent.

The unreacted charged metal ions and the unreacted charged ligands may be bonded to a pair of electrodes of the single capacitive deionizer, the acidic solvent may flow to the single capacitive deionizer so that the unreacted charged ligands and the unreacted charged metal ions move to the acidic solvent by adjusting potentials of the electrodes, and the acidic solvent may be supplied to the 1) mixing steel slag and an acidic solvent.

The complex compound with no charge may be separated from unreacted charged ligands and unreacted charged metal ions by the electrochemical method using a multistage capacitive deionizer in the 4) separating the complex compound from the third mixture, the unreacted charged metal ions may be supplied to the 1) mixing steel slag and an acidic solvent, and the unreacted charged ligands may be recovered and supplied to the 3) inserting and mixing ligands into and with the second mixture.

The unreacted charged ligands may be bonded to an anode of the multistage capacitive deionizer, the acidic solvent may flow to the multistage capacitive deionizer so that the unreacted charged ligands move to the acidic solvent by changing the anode to a cathode, and the acidic solvent containing the recovered unreacted charged ligands may be supplied to the 3) inserting and mixing ligands into and with the second mixture.

The unreacted charged metal ions may be bonded to a cathode of the multistage capacitive deionizer, the acidic solvent may flow to the multistage capacitive deionizer so that the unreacted charged metal ions move to the acidic solvent by changing the cathode to an anode, and the acidic solvent containing the recovered unreacted charged metal ions may be supplied to the 1) mixing steel slag and an acidic solvent.

The acidic solvent may be one or more selected from a group consisting of nitric acid ($HNO_3$), hydrochloric acid (HCl), sulfuric acid ($H_2SO_4$), hydrobromide acid (HBr), hydroiodide acid (HI), perchloric acid ($HClO_4$), and phosphoric acid ($H_3PO_4$), but the present invention is not limited thereto.

The metal ions of the first mixture may be calcium ions ($Ca^{2+}$), but the present invention is not limited thereto.

The ligands may be ligands including one or more selected from a group consisting of $CH_3COOH$, $C_6H_9NO_6$, $C_6H_5NO_2$, $HN(CH_2CO_2H)_2$, $citrate^{3+}$, $glutamate^+$, and $C_2H_2O_4$, but the present invention is not limited thereto.

The carbonate may be $CaCO_3$, but the present invention is not limited thereto.

The first filter may have pores with a diameter of 30 μm to 50 μm, but the present invention is not limited thereto.

In accordance with another aspect of the present invention, a system for recovering carbonate from steel slag comprises a metal ion extraction unit configured to mix steel slag and an acidic solvent to produce a first mixture containing metal ions; a separation unit configured to separate the first mixture generated by the metal ion extraction unit into a second mixture, containing the metal ions, and residues; a complex compound production unit configured to insert and mix ligands into and with the second mixture separated by the separation unit to produce a complex compound by reaction of the ligands with the metal ions; a complex compound separation unit configured to separate the complex compound produced by the complex compound production unit; a carbonation process unit configured to react the complex compound, separated by the complex compound separation unit, with carbon dioxide to produce carbonate; and a carbonate separation unit configured to separate the carbonate produced by the carbonation process unit.

The complex compound separation unit may separate the complex compound with no charge from unreacted charged ligands and unreacted charged metal ions by an electrochemical method using a single capacitive deionizer.

The complex compound separation unit may include a first recovery unit configured to recover the unreacted charged ligands and the unreacted charged metal ions from the single capacitive deionizer and to supply the recovered unreacted charged ligands and unreacted charged metal ions to the metal ion extraction unit.

The complex compound separation unit may separate the complex compound with no charge into unreacted charged ligands and unreacted charged metal ions by an electrochemical method using a multistage capacitive deionizer.

The complex compound separation unit may include a first recovery unit configured to recover the unreacted charged metal ions from the multistage capacitive deionizer and to supply the recovered unreacted charged metal ions to the metal ion extraction unit, and a second recovery unit configured to recover the unreacted charged ligands from the multistage capacitive deionizer and to supply the recovered unreacted charged ligands to the complex compound production unit.

The separation unit may include a filter, and the filter may have pores with a diameter of 30 μm to 50 μm.

The metal ions in the metal ion extraction unit may be calcium ions ($Ca^{2+}$).

The ligands in the complex compound production unit may be ligands including one or more selected from a group consisting of $CH_3COOH$, $C_6H_9NO_6$, $C_6H_5NO_2$, $HN(CH_2CO_2H)_2$, $citrate^{3+}$, $glutamate^+$, and $C_2H_2O_4$.

The carbonate may be $CaCO_3$.

It is to be understood that both the foregoing general description and the following detailed description of the present invention are exemplary and explanatory and are intended to provide further explanation of the invention as claimed.

BRIEF DESCRIPTION OF THE DRAWINGS

The above and other features of the present invention will be more clearly understood from the following detailed description taken in conjunction with the accompanying drawings, in which.

DESCRIPTION OF SPECIFIC EMBODIMENTS

Figure 1:
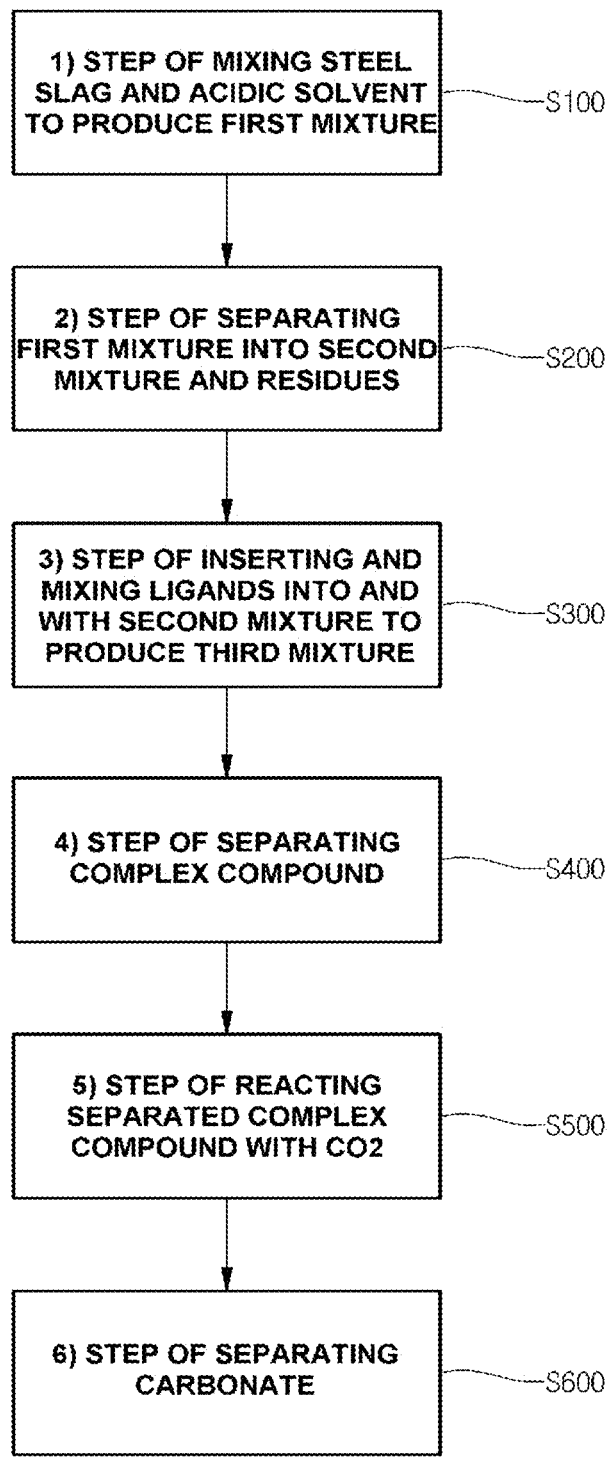
FIG. 1 is a flowchart illustrating a method of recovering carbonate from steel slag according to an embodiment of the present invention.

Reference will now be made in detail to embodiments, examples of which are illustrated in the accompanying drawings. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art.

In the drawings, the thickness or size of each layer is exaggerated, omitted, or schematically illustrated for convenience of description and clarity. Throughout the disclosure, like reference numerals refer to like parts throughout the various figures and embodiments of the present invention. As used herein, the term "and/or" includes any and all combinations of one or more of the associated listed items.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "include," "includes," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a method and system for recovering carbonate from steel slag according to exemplary embodiments of the present invention will be described with reference to the accompanying drawings.

FIG. 1 is a flowchart illustrating a method of recovering carbonate from steel slag according to an embodiment of the present invention. The method includes 1) a step of mixing steel slag and an acidic solvent to produce a first mixture (S100), 2) a step of separating the first mixture of the step 1) into a second mixture and residues (S200), 3) a step of inserting and mixing ligands into and with the second mixture of the step 2) to produce a third mixture (S300), 4) a step of separating a complex compound from the third mixture of the step 3) (S400), 5) a step of reacting the separated complex compound with $CO_2$ (S500), and 6) a step of separating carbonate produced by reaction with the $CO_2$ (S600). Hereinafter, the method of recovering carbonate will be described for each step.

The step 1) is a step of mixing steel slag and an acidic solvent to produce a first mixture (S100). In more detail, the steel slag is primarily crushed with a jaw crusher and particles having a diameter less than 1000 μm are secondarily sorted from the crushed steel slag using a sieve, in order for the steel slag to be recovered and easily reacted with the acidic solvent. That is, the steel slag having minute particles is obtained through the primary crushing work and the secondary sorting work since it is possible to enlarge a contact area of the steel slag that reacts with the acidic solvent when the particles are small. The steel slag having minute particles is mixed and reacted with the acidic solvent. The acidic solvent is one or more selected from a group consisting of nitric acid ($HNO_3$), hydrochloric acid (HCl), sulfuric acid ($H_2SO_4$), hydrobromide acid (HBr), hydroiodide acid (HI), perchloric acid ($HClO_4$), and phosphoric acid ($H_3PO_4$), but the present invention is not limited thereto. Preferably, the acidic solvent is a 1.0M, 1.5M, or 2.5M nitric acid ($HNO_3$) solvent. When the steel slag is mixed with the acidic solvent, the metal components in the steel slag are present in the form of metal ions in the acidic solvent. Accordingly, the first mixture is a mixture of the steel slag, the acidic solvent, and the metal ions. In order for the metal components of the steel slag to be present as metal ions by reaction with the acidic solvent, they may be agitated with a magnetic bar.

The step 2) is a step of separating the first mixture of the step 1) into a second mixture and residues (S200). In more detail, the first mixture is a mixture of the steel slag, the acidic solvent, and the metal ions. In this case, since only the acidic solvent and the metal ions pass through a first filter, unreacted steel slag may be a residue. The steel slag reacts with the acidic solvent to extract metal ions. However, since the first mixture includes steel slag, which is not reacted with the acidic solvent, and components other than the metal components, the step 2) is performed to sort only metal ions from among them. The first filter has pores with a diameter of 30 μm to 50 μm. Thus, the unreacted steel slag and the components other than the metal components, which each have large particles, may be resides since they do not pass through the first filter. Since only the acidic solvent and the metal ions, each of which has small particles, pass through the first filter, the second mixture may include the metal ions and the acidic solvent.

The step 3) is a step of inserting and mixing ligands into and with the second mixture of the step 2) to produce a third mixture (S300). In more detail, the ligands may be inserted into and mixed with the second mixture, which includes the metal ions and the acidic solvent, and react with the metal ions so as to produce a complex compound. A ligand means a molecule or ion that is bonded around the central metal ion of a coordination compound, and essentially has an unshared electron pair for coordinate bond with the metal ion. Since ligands selectively react with metal ions, it is possible to selectively extract calcium ions ($Ca^{2+}$) from among various metal ions of the second mixture. That is, it is possible to selectively extract specific metal ions using the characteristics of the ligands that are coordinately bonded to the specific metal ions. Such a ligand is one or more selected from a group consisting of $CH_3COOH$, $C_6H_9NO_6$, $C_6H_5NO_2$, $HN(CH_2CO_2H)_2$, and $C_2H_2O_4$, and is preferably $C_2H_2O_4$. Although any ligand is usable as long as it is selectively bonded to a calcium ion ($Ca^{2+}$), the present invention is not limited thereto. Accordingly, the third mixture may include an acidic solvent, a complex compound, unreacted ligands, and unreacted metal ions.

The step 4) is a step of separating a complex compound from the third mixture of the step 3) (S400). In more detail, the step 4) is a step of separating a complex compound from the third mixture including the acidic solvent, the complex compound, the unreacted ligands, and the unreacted metal ions. It is possible to separate a complex compound by an electrochemical method using the characteristics of a coordination complex compound with no charge. The electrochemical method enables the complex compound to be separated from the unreacted ligands and the unreacted metal ions by using a capacitive deionizer. Although such an unreacted metal ion may be, for example, $Fe^{2+}$, $Si^{2+}$, or $Al^{2+}$, the present invention is not limited thereto. For example, the unreacted metal ions may include metal ions other than the illustrated metal ion depending on the steel slag. The capacitive deionizer includes a pair of electrodes, a pair of carbon fiber electrodes, and a pair of ion exchange membranes. The pair of electrodes may be disposed at both ends of the capacitive deionizer, the pair of carbon fiber electrodes may be formed on the inner surfaces of the pair of electrodes, and the pair of ion exchange membranes may be formed inside the pair of carbon fiber electrodes.

The separation by the electrochemical method is performed using the characteristics of negatively-charged ligands and unreacted positively-charged metal ions. When the third mixture of the step 3) passes through the capacitive deionizer, the negatively-charged ligands move to an anode of the capacitive deionizer and the unreacted positively-charged metal ions move to a cathode of the capacitive deionizer. In this case, they pass through the ion exchange membranes that selectively pass ions. The ion exchange membranes may maximize adsorption efficiency in each electrode and facilitate recovery of desorbed ions during desorption.

The acidic solvent and the complex compound are separated by the electrochemical method, and carbonate may be produced in the step of reacting the separated complex compound with $CO_2$ (S500). The reacting a complex compound with $CO_2$ will be referred to as a carbonation process. That is, in a complex compound, in which a ligand is coordinately bonded about a metal ion, the metal ion has higher reactivity with $CO_2$ than the ligand. Accordingly, when the complex compound separated by the electrochemical method reacts with $CO_2$, the carbonate is produced by reaction of the metal ions ($Ca^{2+}$) of the complex compound with $CO_2$, and the coordinate bond of the ligands of the complex compound is broken so that the ligands are present in the solution. That is, the carbonate may be produced by the high reactivity between the metal ions and the $CO_2$. Here, the solution must be alkalized in order to increase reactivity between metal ions and $CO_2$ in the carbonation process. However, the solution separated in the step (S400) is acidic since it is a mixture of the acidic solvent and the complex compound. For this reason, there is a problem in that the carbonate has low reactivity even when $CO_2$ is put into the acidic solution. To avoid this problem, a strong alkali is inserted into and mixed with the solution separated in the step (S400) so that the solution is alkaline. That is, the solution separated in the step (S400) has about a pH of 2, but an alkali is added to the solution such that the solution has about a pH of 9. Although the added alkali is a strong alkali such as $NH_4OH$, NaOH, or KOH, the present invention is not limited thereto as long as it increases the pH of the solution.

It is possible to recover only carbonate in the step of separating the carbonate produced by using the high reactivity between the metal ions ($Ca^{2+}$) and the $CO_2$ (S600). The carbonate is $CaCO_3$, and the solution passes through a second filter to obtain only the carbonate. The second filter has a plurality of pores with a diameter of 30 μm to 40 μm. When the solution passes through the second filter after the carbonation process, carbonate having a size greater than 40 μm does not pass through the second filter so that no carbonate is present in the solution passing through the second filter.

Figure 2:
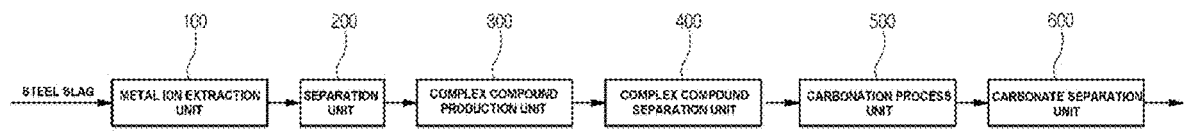
FIG. 2 is a diagram illustrating a system for recovering carbonate from steel slag according to another embodiment of the present invention.
Figure 3:
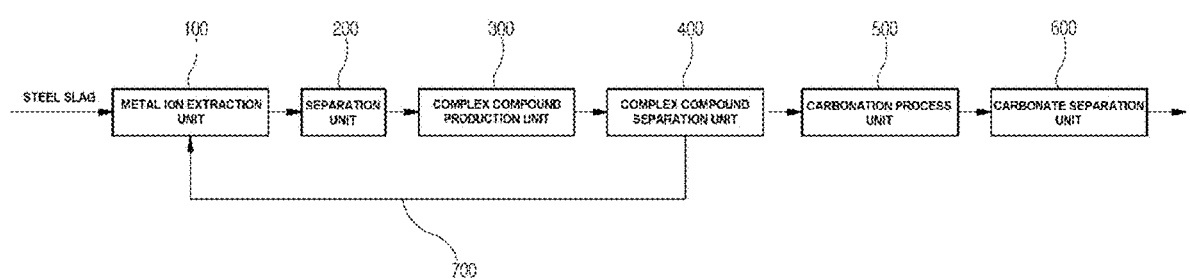
FIG. 3 is a diagram illustrating a system for recovering carbonate from steel slag according to a still another embodiment of the present invention.

FIGS. 2 and 3 are diagrams illustrating a system for recovering carbonate from steel slag according to embodiments of the present invention.

As illustrated in FIG. 2, the system for recovering carbonate from steel slag according to another embodiment of the present invention may include a metal ion extraction unit 100, a separation unit 200, a complex compound production unit 300, a complex compound separation unit 400, a carbonation process unit 500, and a carbonate separation unit 600.

In more detail, the metal ion extraction unit 100 is configured to mix steel slag and an acidic solvent to produce a first mixture containing metal ions. In order to extract the metal components, which are contained in the steel slag, as metal ions, the steel slag reacts with the acidic solvent to extract the metal ions and the first mixture is produced by mixing the steel slag with the acidic solvent. The first mixture includes unreacted steel slag, the acidic solvent, and the metal ions.

The separation unit 200 is configured to separate the first mixture generated by the metal ion extraction unit 100 into a second mixture containing metal ions and residues. Since the first mixture includes the unreacted steel slag, the acidic solvent, and the metal ions as described above, the unreacted steel slag, which is unnecessary in the system for recovering carbonate of the present invention, is separated and recovered as a residue. Thus, it is possible to obtain the second mixture including the acidic solvent and the metal ions.

The complex compound production unit 300 is configured to insert and mix ligands into and with the second mixture separated by the separation unit 200 to produce a complex compound by reaction of the ligands with the metal ions. As described above, a complex compound may be produced by coordinate bond between a ligand and a specific metal ion. That is, the ligands are inserted into the second mixture and selectively reacted with only calcium ions ($Ca^{2+}$) from among various metal ions of the second mixture, thereby producing the complex compound.

The complex compound separation unit 400 is configured to separate the complex compound produced by the complex compound production unit 300. In more detail, the complex compound separation unit 400 separates the complex compound from unreacted ligands and unreacted metal ions by using a capacitive deionizer. The complex compound separation unit 400 may effectively separate only the complex compound using the characteristics of the complex compound with no charge, the unreacted charged ligands, and the unreacted charged metal ions.

The carbonation process unit 500 is configured to react the complex compound, which is separated by the complex compound separation unit 400, with $CO_2$ to produce carbonate. When a complex compound produced by selective reaction of a ligand with a metal ion reacts with $CO_2$, the metal ion of the complex compound has higher reactivity with $CO_2$ than the ligand. Accordingly, when the complex compound reacts with $CO_2$, the carbonate may be produced by reaction of the metal ions ($Ca^{2+}$) of the complex compound with the $CO_2$. However, the solution flowing into the carbonation process unit 500 is acidic, and a carbonation reaction does not occur in the acidic solution even though the acidic solution reacts with $CO_2$. Thus, a buffer solution may be mixed with the acidic solution to increase the pH of the acidic solution. Although the buffer solution is a strong alkali such as $NH_4OH$, NaOH, or KOH, the present invention is not limited thereto.

The carbonate separation unit 600 is configured to separate the carbonate produced by the carbonation process unit 500, and includes a filter having a plurality of pores with a diameter of 30 μm to 40 μm. Since each pore in the filter of the carbonate separation unit 600 has a maximum diameter of 40 μm, carbonate having a diameter greater than 40 μm does not pass through the carbonate separation unit 600. Therefore, it is possible to separate only carbonate according to the diameter thereof.

FIG. 3 illustrates a system for recovering carbonate from steel slag according to a still another embodiment of the present invention, and the system may further include a first recovery unit 700. The first recovery unit 700 is configured to return the unreacted metal ions separated by the complex compound separation unit 400 back to the metal ion extraction unit. That is, the metal ions separated by the capacitive deionizer will include calcium ions ($Ca^{2+}$) that are not reacted with ligands, and the unreacted metal ions move back to the metal ion extraction unit so as to pass through the system for recovering carbonate. Thus, it is possible to significantly improve the recovery rate of carbonate.

Figure 4:
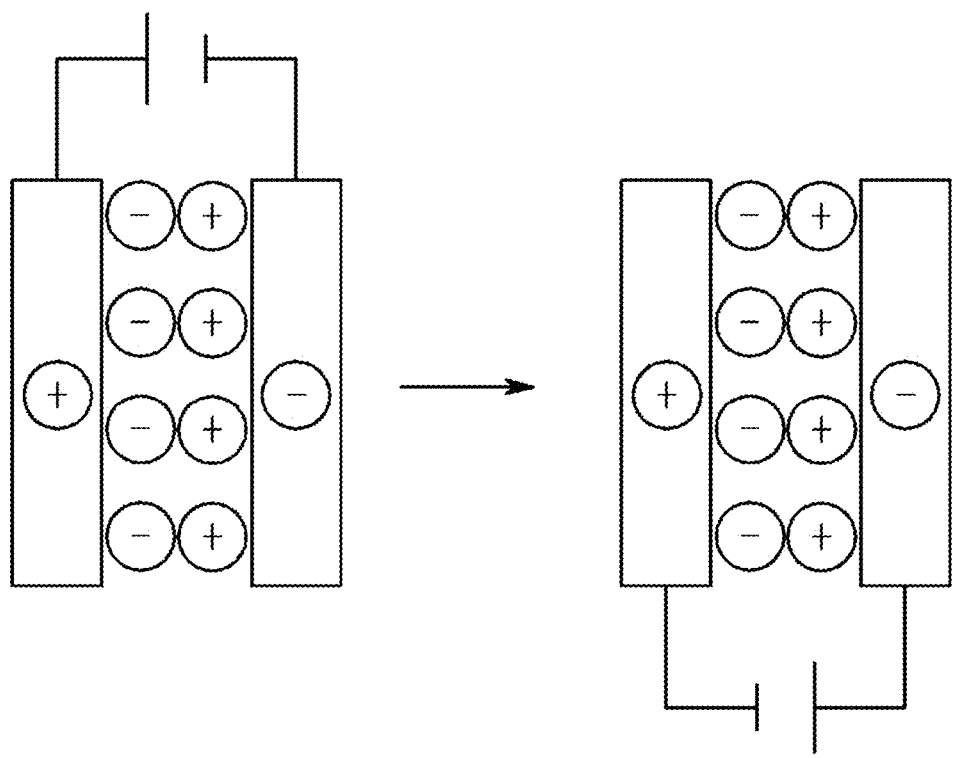
FIG. 4 is a conceptual view illustrating a single capacitive deionizer according to the embodiment of the present invention.

FIG. 4 is a conceptual view illustrating a single capacitive deionizer according to the embodiment of the present invention, and the single capacitive deionizer includes a pair of electrodes consisting of an anode and a cathode. When the complex compound, the unreacted ligands, and the unreacted metal ions, which are produced in the complex compound production unit 300, pass through the single capacitive deionizer, the unreacted ligands and the unreacted metal ions have a charge to be bonded to the electrodes of the single capacitive deionizer, and the complex compound passes through the single capacitive deionizer. When the solvent including the complex compound passes through the single capacitive deionizer, the unreacted ligands and the unreacted metal ions are desorbed and recovered to be supplied back to the metal ion extraction unit 100 by adjusting the potentials of the electrodes of the single capacitive deionizer.

Figure 5:
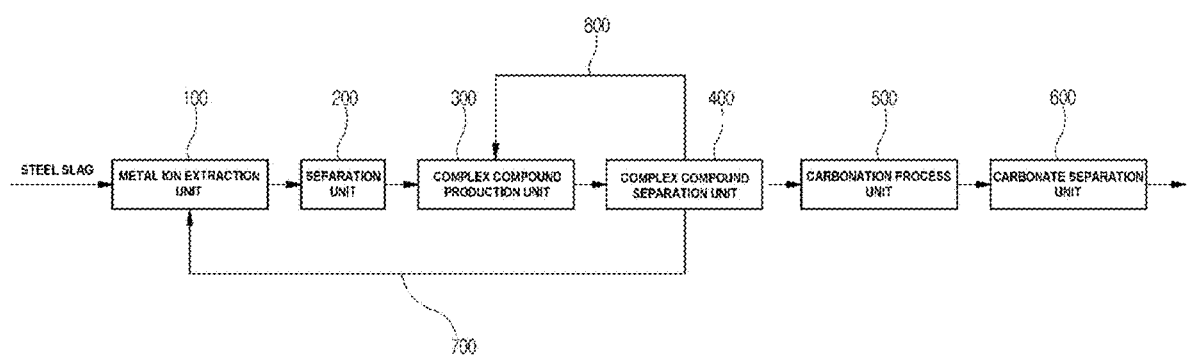
FIG. 5 is a diagram illustrating a system for recovering carbonate from steel slag according to a further embodiment of the present invention.

FIG. 5 illustrates a system for recovering carbonate from steel slag according to a further embodiment of the present invention, and the system may further include a first recovery unit 700 and a second recovery unit 800. The first recovery unit 700 is configured to return the unreacted metal ions separated by the complex compound separation unit 400 back to the metal ion extraction unit 100. The second recovery unit 800 is configured to recover and supply the unreacted ligands from and back to the complex compound production unit 300. In FIG. 5, a multistage capacitive deionizer is used instead of the single capacitive deionizer in order to separately recover only the unreacted ligands through the second recovery unit 800. The respective unreacted metal ions and ligands are recovered and moved to the metal ion extraction unit 100 and the complex compound production unit 300 through the first and second recovery units 700 and 800.

Figure 6:
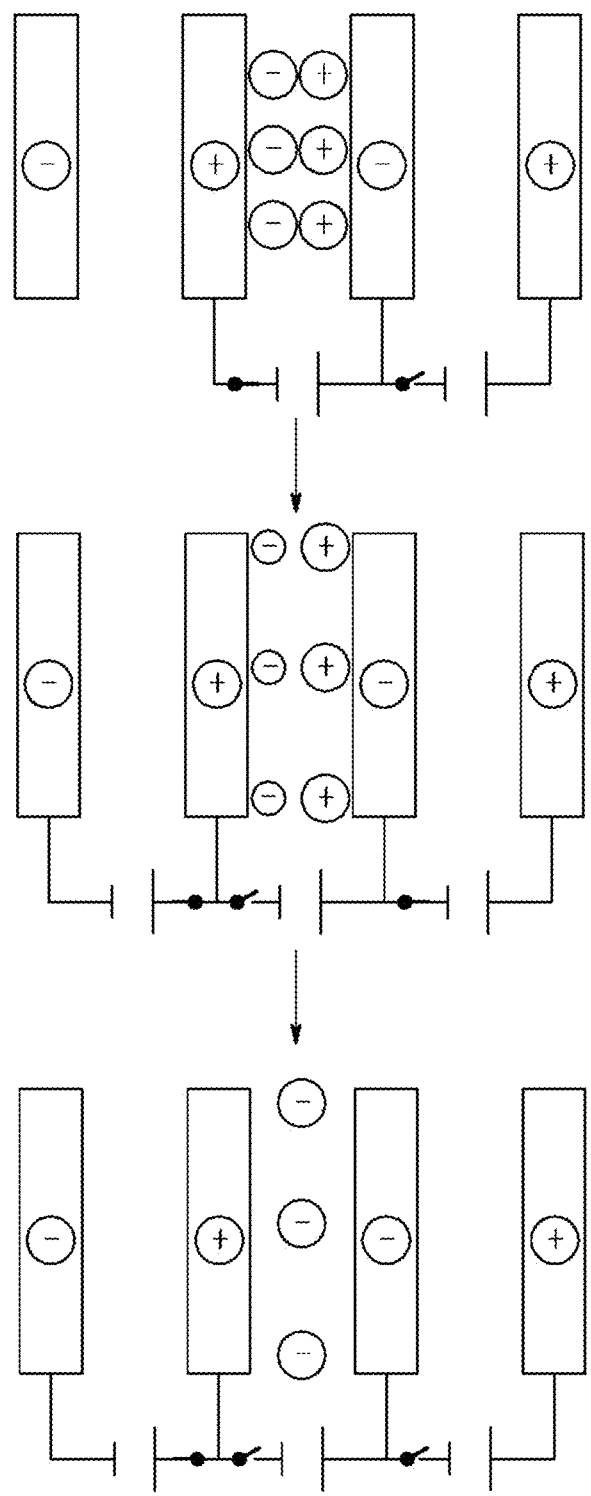
FIG. 6 is a conceptual view illustrating a multistage capacitive deionizer according to the embodiment of the present invention.

FIG. 6 is a conceptual view illustrating the multistage capacitive deionizer according to the embodiment of the present invention. The multistage capacitive deionizer further includes electrodes facing the respective electrodes of the single capacitive deionizer. That is, the multistage capacitive deionizer further includes a cathode facing the anode of the single capacitive deionizer and an anode facing the cathode of the single capacitive deionizer. Accordingly, when it is intended to recover only unreacted metal ions adsorbed onto the cathode of the capacitive deionizer, only the unreacted metal ions may be recovered by adjusting the potentials of the cathode and the anode facing the cathode. On the other hand, when it is intended to recover only unreacted ligands adsorbed onto the anode of the capacitive deionizer, only the unreacted ligands may be recovered by adjusting the potentials of the anode and the cathode facing the anode. The respective recovered unreacted metal ions and ligands move to the metal ion extraction unit 100 and the complex compound production unit 300 through the first and second recovery units 700 and 800.

Figure 7:
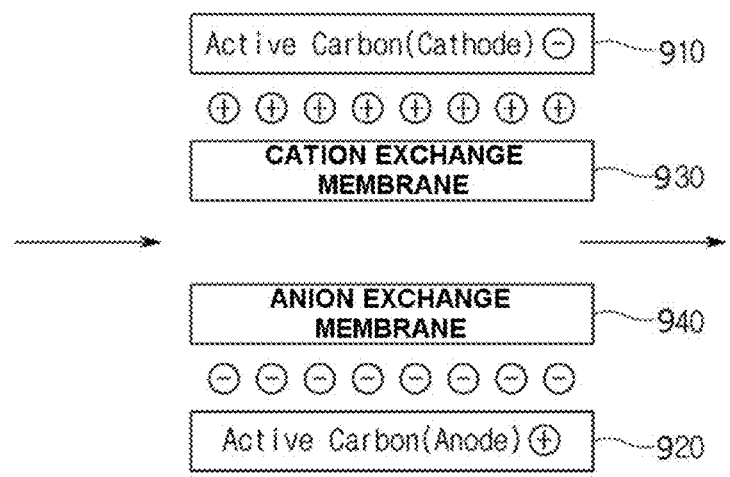
FIG. 7 is a view illustrating a capacitive deionizer used in an electrochemical process according to the embodiment of the present invention.

As illustrated in FIG. 7, the capacitive deionizer includes a carbon fiber electrode 910 as a cathode, a carbon fiber electrode 920 as an anode, a cation exchange membrane 930, an anion exchange membrane 940, and a pair of electrodes (not shown). The pair of electrodes may be disposed at both ends of the capacitive deionizer, the pair of carbon fiber electrodes 910 and 920 may be formed on the inner surfaces of the pair of electrodes, and the pair of ion exchange membranes 930 and 940 may be formed inside the pair of carbon fiber electrodes 910 and 920.

A carbon fiber has high heat resistance and shock resistance, and is resistant to chemicals. The carbon fiber has a light weight since molecules, such as oxygen, hydrogen, and nitrogen, are extracted therefrom in a heating process to manufacture, whereas it has high elasticity and strength. In addition, the carbon fiber has high electrical conductivity, flexibility by virtue of a high modulus of elasticity, and thus high flexural deformation. Therefore, it is possible to easily produce the carbon fiber in various patterns and shapes.

A pair of coating layers (not shown) may be formed on the carbon fiber electrodes 910 and 920 so as to surround them. The coating layers are preferably made of a porous carbon material, and may be particularly made of active carbon slurry, graphene, CNT, or the like.

The carbon fiber electrodes 910 and 920 have a self-ion adsorption ability by virtue of porosity, and have higher adsorbability than active carbon. In addition, since the electrodes include a pair of coating layers (not shown) together with the carbon fiber electrodes 910 and 920, it is possible to improve the performance and rate of adsorption by formation of a dual adsorption structure.

The ion change membranes 930 and 940 are respectively formed inside the carbon fiber electrodes 910 and 920, and serve to selectively pass ions therethrough in order to increase their capabilities to remove ions. The ion change membranes 930 and 940 may consist of an anion exchange membrane through which passes negative ions and a cation exchange membrane through which passes positive ions. It is preferable that the anion exchange membrane be formed at the anode of the capacitive deionizer and the cation exchange membrane be formed at the cathode of the capacitive deionizer. Consequently, it is possible to maximize adsorption efficiency in each electrode and rapidly discharge desorbed ions during desorption by the ion exchange membranes and the flow rate therein.

The thicknesses of the carbon fiber electrodes 910 and 920 may be changed depending on the use of the electrodes and the user's needs.

As is apparent from the above description, the present invention relates to a method and system for recovering carbonate from steel slag. According to the present invention, it is possible to extract carbonate from steel slag and use the extracted carbonate, and to recycle steel slag and make use of $CO_2$ gas without emission to the atmosphere. In addition, it is possible to increase carbonate extraction efficiency by reusing unreacted metal ions and an acidic solvent in a method and system for treating steel slag, and thus to reduce an amount of waste. While the present invention has been described with respect to the specific embodiments, it will be apparent to those skilled in the art that various changes and modifications may be made without departing from the spirit and scope of the invention as defined in the following claims.

What is claimed is:

1. A method of forming carbonate from steel slag, comprising:
   1) mixing steel slag and an acidic solvent to produce a first mixture containing metal ions;
   2) separating the first mixture into a second mixture, containing the metal ions, and residues by allowing the first mixture to pass through a first filter;
   3) inserting and mixing ligands into and with the second mixture to selectively extract specific metal ions of the second mixture by bonding the ligands to the specific metal ions in order to produce a third mixture containing a complex compound produced by reaction of the specific metal ions in the second mixture with the ligands;
   4) separating the reacted metal ions and the reacted ligands of the complex compound from the third mixture by capacitive deionization;
   5) reacting the separated metal ions and ligands of the complex compound with $CO_2$ to produce carbonate; and
   6) separating the produced carbonate by filtration.

2. The method according to claim 1, wherein:
   the complex compound with no charge is separated from unreacted charged ligands and unreacted charged metal ions by the capacitive deionization using a single capacitive deionizer in the 4) separating the complex compound from the third mixture; and
   the unreacted charged ligands and the unreacted charged metal ions are supplied to the 1) mixing steel slag and an acidic solvent.

3. The method according to claim 2, wherein, in the 4) separating the complex compound from the third mixture:
   the unreacted charged metal ions and the unreacted charged ligands are bonded to a pair of electrodes of the single capacitive deionizer; and
   the acidic solvent flows to the single capacitive deionizer so that the unreacted charged ligands and the unreacted charged metal ions move from the electrodes to the acidic solvent by adjusting potentials of the electrodes.

4. The method according to claim 1, wherein:
   the complex compound with no charge is separated from unreacted charged ligands and unreacted charged metal ions by the capacitive deionization using a multistage capacitive deionizer in the 4) separating the complex compound from the third mixture;

the unreacted charged metal ions are recovered and supplied to the 1) mixing steel slag and an acidic solvent; and the unreacted charged ligands are recovered and supplied to the 3) inserting and mixing ligands into and with the second mixture.

5. The method according to claim 4, wherein, in the 4) separating the complex compound from the third mixture:

the unreacted charged ligands are bonded to an anode of the multistage capacitive deionizer; and the acidic solvent flows to the multistage capacitive deionizer so that the unreacted charged ligands move from the electrodes to the acidic solvent by changing the anode to a cathode, the method further comprising:

supplying the acidic solvent containing the recovered unreacted charged ligands to the 3) inserting and mixing ligands into and with the second mixture.

6. The method according to claim 4, wherein, in the 4) separating the complex compound from the third mixture:

the unreacted charged metal ions are bonded to a cathode of the multistage capacitive deionizer; and the acidic solvent flows to the multistage capacitive deionizer so that the unreacted charged metal ions move from the electrodes to the acidic solvent by changing the cathode to an anode, the method further comprising:

supplying the acidic solvent containing the recovered unreacted charged metal ions to the 1) mixing steel slag and an acidic solvent.

7. The method according to claim 1, wherein the acidic solvent is one or more selected from the group consisting of nitric acid ($HNO_3$), hydrochloric acid (HCl), sulfuric acid ($H_2SO_4$), hydrobromide acid (HBr), hydroiodide acid (HI), perchloric acid ($HClO_4$), and phosphoric acid ($H_3PO_4$).

8. The method according to claim 1, wherein the metal ions of the first mixture are calcium ions ($Ca^{2+}$).

9. The method according to claim 1, wherein the ligands are ligands selected from the group consisting of $CH_3COOH$, $C_6H_9NO_6$, $C_6H_5NO_2$, $HN(CH_2CO_2H)_2$, citrate$^{3+}$, glutamate$^+$, and $C_2H_2O_4$.

10. The method according to claim 1, wherein the carbonate is $CaCO_3$.

11. The method according to claim 1, wherein the first filter has pores with a diameter of 30 μm to 50 μm.

* * * * *